(12) United States Patent
Zhou et al.

(10) Patent No.: US 11,647,508 B2
(45) Date of Patent: May 9, 2023

(54) OPERATION RULES FOR GROUP COMPONENT CARRIER BEAM UPDATE

(71) Applicant: QUALCOMM Incorporated, San Diego, CA (US)

(72) Inventors: Yan Zhou, San Diego, CA (US); Mostafa Khoshnevisan, San Diego, CA (US); Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 16/949,396

(22) Filed: Oct. 28, 2020

(65) Prior Publication Data

US 2021/0135801 A1    May 6, 2021

Related U.S. Application Data

(60) Provisional application No. 62/929,725, filed on Nov. 1, 2019.

(51) Int. Cl.
*H04W 72/04*    (2009.01)
*H04L 5/00*    (2006.01)
(Continued)

(52) U.S. Cl.
CPC ........... *H04W 72/042* (2013.01); *H04L 5/001* (2013.01); *H04L 5/0098* (2013.01);
(Continued)

(58) Field of Classification Search
CPC ............. H04W 72/042; H04W 72/044; H04W 72/0453; H04L 5/001; H04L 5/0098
See application file for complete search history.

(56) References Cited

U.S. PATENT DOCUMENTS

2022/0173848 A1*  6/2022  Guan .................. H04B 7/02
2022/0225370 A1*  7/2022  Park .................... H04L 5/001

OTHER PUBLICATIONS

Intel Corporation: "Discussion on Multi-Beam Enhancements", 3GPP Draft, 3GPP TSG RAN WG1 #98bis, R1-1910669, Discussion on Multi-Beam Enhancements, 3rd Generation Partnership Project (3GPP), Mobile Competence Centre, 650, Route Des Lucioles, F-06921 Sophia-Antipolis Cedex, France, vol. RAN WG1. No. Chongqing, China, Oct. 14, 2019-Oct. 18, 2019, Oct. 5, 2019 (Oct. 5, 2019), XP051808634, 10 Pages, Retrieved from the Internet: URL: https://ftp.3gpp.org/tsg_ran/WG1_RL1/TSGR1_98b/Docs/R1-1910669.zip. R1-1910669 Discussion on multi-beam enhancements.docx [retrieved on Oct. 5, 2019] the whole document.

(Continued)

*Primary Examiner* — Kevin C. Harper
(74) *Attorney, Agent, or Firm* — Harrity & Harrity, LLP

(57) ABSTRACT

A method, an apparatus, and a computer program product for wireless communication are provided. A user equipment (UE) may receive a signaling message configuring one or more component carrier groups for joint transmission configuration indication (TCI) state activation. When a beam update command indicates an updated TCI state for an individual component carrier, the UE may apply the beam update command after an action time based at least in part on a format of the beam update command. Furthermore, the UE may be configured with rules for applying the beam update command if the individual component carrier is not included in any of the component carrier groups and/or multiple beam update commands are received within a threshold time. Additionally, the UE may prioritize quasi co-located (QCL) reception for all component carriers that are associated with the same TCI state as another component carrier for which QCL reception is prioritized.

44 Claims, 9 Drawing Sheets

(51) Int. Cl.
    *H04W 72/0453*   (2023.01)
    *H04W 72/044*    (2023.01)
(52) U.S. Cl.
    CPC ..... *H04W 72/044* (2013.01); *H04W 72/0453* (2013.01); *H04L 5/0053* (2013.01)

(56) References Cited

OTHER PUBLICATIONS

International Search Report and Written Opinion—PCT/US2020/070720—ISA/EPO—dated Feb. 22, 2021.
LG Electronics: "Feature Lead Summary#5 of Enhancements on Multi-Beam Operations", 3GPP Draft, 3GPP TSG RAN WG1 Meeting #98bis, R1-1911593, R1#98BIS FL Summary#5 Multibeam(MB1) V4. 3rd Generation Partnership Project (3GPP), Mobile Competence Centre, 650, Route Des Lucioles, F-06921 Sophia-Antipolis Cedex, France, vol. RAN WG1. No. Chongqing, China, Oct. 14, 2019-Oct. 20, 2019, Oct. 22, 2019 (Oct. 22, 2019), XP051798848, 28 Pages, Retrieved from the Internet: URL: https://ftp.3gpp.org/tsg_ran/WG1_RL1/TSGR1_98b/Docs/R1-1911593.zip. R1-1911S93 R1#9Sbis FL summary#5 Multi Beam(MB1) v4.docx. [retrieved on Oct. 22, 2019] pp. 5-7. 2.2. Issue#2.2: Simultaneous spatial relation update for multiple PUCCH resources pp. 7-12. 2.3.Issue#2.3: Default spatial relation for dedicated-PUCCH/SRS in FR2 pp. 12-17. 2.4. Issue#2.4: Simultaneous TCI states activation/selection across multiple CCs/BWPs.
Qualcomm Incorporated: "Beam Management for NR", 3GPP Draft, R1-1813396, Beam Management for NR, 3rd Generation Partnership Project (3GPP), Mobile Competence Centre, 650, Route Des Lucioles, F-06921 Sophia-Antipolis Cedex, France, vol. RAN WG1. No. Spokane. US, Nov. 12, 2018-Nov. 16, 2018, Nov. 3, 2018 (Nov. 3, 2018), XP051479713, 5 Pages, Retrieved from the Internet: URL: http://www.3gpp.org/ftp/tsg%5Fran/WG1%5FRL1/TSGR1%5F95/Docs/R1%2D1813396%2Ezip. [retrieved on Nov. 3, 2018] the whole document.
Qualcomm Incorporated: "Enhancements on Multi-Beam Operation", 3GPP Draft, 3GPP TSG-RAN WG1 Meeting #98, R1-1909273, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 26, 2019-Aug. 30, 2019, Aug. 17, 2019 (Aug. 17, 2019), XP051765878, 19 Pages, Retrieved from the Internet: URL: http://www.3gpp.org/ftp/tsg_ran/WG1_RL1/TSGR1_98/Docs/R1-1909273.zip [retrieved on Aug. 17, 2019] Section 7.4.
ZTE: "Details of Latency and Overhead Reduction for Beam Management", 3GPP Draft, R1-1906245, 3GPP TSG RAN WG1 #97, Details of Latency and Overhead Reduction for Beam, 3rd Generation Partnership Project (3GPP), Mobile Competence Centre, 650, Route Des Lucioles, F-06921 Sophia-Antipolis Cede, vol. RAN WG1. No. Reno, USA, May 13, 2019-May 17, 2019, May 13, 2019 (May 13, 2019), XP051727698, 6 Pages, Retrieved from the Internet: URL: http://www.3gpp.org/ftp/Meetings%5F3GPP%5FSYNC/RAN1/Docs/R1%2D1906245%2Ezip. [retrieved on May 13, 2019] the whole document.

* cited by examiner

OPERATION RULES FOR GROUP COMPONENT CARRIER BEAM UPDATE

CROSS-REFERENCE TO RELATED APPLICATION

This Patent Application claims priority to U.S. Provisional Patent Application No. 62/929,725, filed on Nov. 1, 2019, entitled "OPERATION RULES FOR GROUP COMPONENT CARRIER BEAM UPDATE," and assigned to the assignee hereof. The disclosure of the prior Application is considered part of and is incorporated by reference into this Patent Application.

BACKGROUND

Field

Aspects of the present disclosure generally relate to wireless communication and to techniques and apparatuses for operation rules for group component carrier beam update.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some communications systems, such as 5G, a bandwidth may be divided into a plurality of bandwidth parts and/or a plurality of component carriers. Each bandwidth part and/or component carrier may enable uplink and/or downlink communication between a user equipment (UE) and a base station (BS) using parameters that may be specific to the bandwidth part and/or component carrier. For example, a UE may communicate with a BS on a first bandwidth part in accordance with a first communication configuration and may communicate with the BS on a second bandwidth part in accordance with a second communication configuration. This may enable flexibility in deployments of UEs, power saving configurations, and/or the like relative to a single communication configuration for an entire bandwidth.

A BS may transmit a medium access control (MAC) control element (CE) to activate a set of transmission configuration indicator (TCI) states (e.g., associated with a set of TCI state identifiers) for a physical downlink shared channel (PDSCH). The UE may apply the set of TCI states to a set of bandwidth parts and/or component carriers within a common band and/or sharing a common analog beamformer. The UE may receive signaling, from the B S, indicating to which component carriers, of a plurality of candidate component carriers within a bandwidth, the UE is to apply the set of TCI states. For example, the BS may provide radio resource control (RRC) signaling indicating the set of component carriers and/or a set of bandwidth parts corresponding to the set of component carriers, and the UE may group the set of component carriers based on the RRC signaling. In this way, when the UE receives signaling (e.g., a MAC-CE) to activate a set of TCI states, the UE may apply the subsequent signaling to the group of component carriers rather than to all component carriers of the plurality of candidate component carriers. In some cases, the UE may be configured with a plurality of groups of component carriers. In this case, when the UE receives signaling to activate a set of TCI states for a particular component carrier, the UE may apply the signaling to each component carrier within a component carrier group that includes the particular component carrier.

Accordingly, by providing signaling that enables the UE to activate a set of TCI states for each component carrier in the component carrier group that includes the particular component carrier, signaling overhead may be reduced relative to systems in which signaling is used to activate a set of TCI states for individual component carriers, bandwidth parts, and/or the like. Furthermore, providing group-based signaling to enable joint activation of a set of TCI states for all component carriers, bandwidth parts, and/or the like in a particular component carrier group may enable more flexibility in carrier aggregation scenarios where the UE and the BS communicate over multiple carriers simultaneously. However, the UE may need to determine how to apply the signaling in cases where the particular component carrier identified in the signaling is not included in any of the groups of component carriers configured for the UE, when the signaling is to take effect, how to resolve cases in which the UE receives multiple signaling messages updating TCI states for a component carrier group, how to prioritize reception for different component carriers, and/or the like.

Some aspects described herein provide various operation rules for updating beam information for a component carrier group. For example, a UE may receive signaling (e.g., RRC signaling) from a BS to configure one or more component carrier groups, and the UE may receive subsequent signaling (e.g., a MAC-CE) that includes a beam update command identifying an individual component carrier and one or more TCI states to apply to the individual component carrier. In general, as described above, the UE may apply the one or more TCI states indicated in the beam update command to each component carrier that is in the same component carrier group as the individual component carrier identified in the beam update command and to each bandwidth part within such component carriers. However, in some cases, a beam update command may indicate an updated TCI state for an individual component carrier that is not included in any of the component carrier groups. In such cases, the UE may apply the beam update command to the individual component carrier identified in the beam update command. Additionally, or alternatively, the UE may form an implicit component carrier group that includes all configured component carriers that are not in the component carrier group(s) configured by the BS, and the UE may apply the beam update command to all of the component carriers in the implicit component carrier group. Furthermore, in some cases, the UE may determine an action time when the beam update command is ready to be applied (e.g., implicitly based on a time that the component carrier groups are configured, explicitly based on signaling provided by the BS, and/or the like). Additionally, in some aspects, the UE may apply one or more rules to resolve multiple beam update commands that are received simultaneously or within a threshold time of one another and/or to prioritize quasi co-located (QCL) reception for component carriers that are associated with the same TCI state as another component carrier for which QCL reception is prioritized.

In some aspects, a method of wireless communication, performed by a UE, may include receiving a signaling message that indicates one or more indicated component carrier sets, wherein the one or more indicated component carrier sets each include a component carrier group associated with joint TCI state activation; receiving a beam update command that identifies an individual component carrier and a TCI state to activate for the individual component carrier, wherein the individual component carrier is not included in the one or more indicated component carrier sets; and applying the beam update command to a set of one or more component carriers that includes at least the individual component carrier, wherein the individual component carrier is included in the set of one or more component carriers based at least in part on the individual component carrier not being in any of the one or more indicated component carrier sets.

In some aspects, a method of wireless communication, performed by a UE, may include receiving a signaling message that indicates one or more component carrier sets, wherein the one or more component carrier sets each include a component carrier group associated with joint TCI state activation; receiving a beam update command that identifies a component carrier and a TCI state to activate for the component carrier, wherein the component carrier identified in the beam update command is included in the component carrier group associated with one of the one or more component carrier sets; and applying the beam update command to the component carrier group that includes the component carrier identified in the beam update command after an action time that is based at least in part on whether the beam update command is formatted for individual TCI state activation or joint TCI state activation.

In some aspects, a method of wireless communication, performed by a UE, may include receiving a first beam update command that identifies a first TCI state to activate; receiving a second beam update command that identifies a second TCI state to activate; selecting a beam update command that corresponds to either the first beam update command or the second beam update command based at least in part on a difference in reception times between the first beam update command and the second beam update command satisfying a threshold; and applying the selected beam update command to a component carrier group that includes a component carrier identified in the selected beam update command, wherein applying the selected beam update command includes activating either the first TCI state or the second TCI state for each component carrier in the component carrier group depending on whether the beam update command corresponds to the first beam update command or the second beam update command.

In some aspects, a method of wireless communication, performed by a UE, may include receiving a message enabling joint TCI state activation for multiple component carriers in a component carrier group, wherein the multiple component carriers in the component carrier group are associated with a common TCI state identifier; and prioritizing reception of QCL information associated with each of the multiple component carriers associated with the common TCI state identifier based at least in part on one or more rules prioritizing QCL information associated with at least one of the multiple component carriers in the component carrier group.

In some aspects, a UE for wireless communication may include memory and one or more processors operatively coupled to the memory. The memory and the one or more processors may be configured to receive a signaling message that indicates one or more indicated component carrier sets, wherein the one or more indicated component carrier sets each include a component carrier group associated with joint TCI state activation; receive a beam update command that identifies an individual component carrier and a TCI state to activate for the individual component carrier, wherein the individual component carrier is not included in the one or more indicated component carrier sets; and apply the beam update command to a set of one or more component carriers that includes at least the individual component carrier, wherein the individual component carrier is included in the set of one or more component carriers based at least in part on the individual component carrier not being in any of the one or more indicated component carrier sets.

In some aspects, a UE for wireless communication may include memory and one or more processors operatively coupled to the memory. The memory and the one or more processors may be configured to memory; and receive a signaling message that indicates one or more component carrier sets, wherein the one or more component carrier sets each include a component carrier group associated with joint TCI state activation; receive a beam update command that identifies a component carrier and a TCI state to activate for the component carrier, wherein the component carrier identified in the beam update command is included in the component carrier group associated with one of the one or more component carrier sets; and apply the beam update command to the component carrier group that includes the component carrier identified in the beam update command after an action time that is based at least in part on whether the beam update command is formatted for individual TCI state activation or joint TCI state activation.

In some aspects, a UE for wireless communication may include memory and one or more processors operatively coupled to the memory. The memory and the one or more processors may be configured to receive a first beam update command that identifies a first TCI state to activate; receive a second beam update command that identifies a second TCI state to activate; select a beam update command that corresponds to either the first beam update command or the second beam update command based at least in part on a difference in reception times between the first beam update command and the second beam update command satisfying a threshold; and apply the selected beam update command to a component carrier group that includes a component carrier identified in the selected beam update command, wherein applying the selected beam update command includes activating either the first TCI state or the second TCI state for each component carrier in the component carrier group depending on whether the beam update command corresponds to the first beam update command or the second beam update command.

In some aspects, a UE for wireless communication may include memory and one or more processors operatively coupled to the memory. The memory and the one or more processors may be configured to receive a message enabling joint TCI state activation for multiple component carriers in a component carrier group, wherein the multiple component carriers in the component carrier group are associated with a common TCI state identifier; and prioritize reception of QCL information associated with each of the multiple component carriers associated with the common TCI state identifier based at least in part on one or more rules prioritizing QCL information associated with at least one of the multiple component carriers in the component carrier group.

In some aspects, a non-transitory computer-readable medium may store one or more instructions for wireless communication. The one or more instructions, when executed by one or more processors of a UE, may cause the one or more processors to: receive a signaling message that indicates one or more indicated component carrier sets, wherein the one or more indicated component carrier sets each include a component carrier group associated with joint TCI state activation; receive a beam update command that identifies an individual component carrier and a TCI state to activate for the individual component carrier, wherein the individual component carrier is not included in the one or more indicated component carrier sets; and apply the beam update command to a set of one or more component carriers that includes at least the individual component carrier, wherein the individual component carrier is included in the set of one or more component carriers based at least in part on the individual component carrier not being in any of the one or more indicated component carrier sets.

In some aspects, a non-transitory computer-readable medium may store one or more instructions for wireless communication. The one or more instructions, when executed by one or more processors of a UE, may cause the one or more processors to: receive a signaling message that indicates one or more component carrier sets, wherein the one or more component carrier sets each include a component carrier group associated with joint TCI state activation; receive a beam update command that identifies a component carrier and a TCI state to activate for the component carrier, wherein the component carrier identified in the beam update command is included in the component carrier group associated with one of the one or more component carrier sets; and apply the beam update command to the component carrier group that includes the component carrier identified in the beam update command after an action time that is based at least in part on whether the beam update command is formatted for individual TCI state activation or joint TCI state activation.

In some aspects, a non-transitory computer-readable medium may store one or more instructions for wireless communication. The one or more instructions, when executed by one or more processors of a UE, may cause the one or more processors to: receive a first beam update command that identifies a first TCI state to activate; receive a second beam update command that identifies a second TCI state to activate; select a beam update command that corresponds to either the first beam update command or the second beam update command based at least in part on a difference in reception times between the first beam update command and the second beam update command satisfying a threshold; and apply the selected beam update command to a component carrier group that includes a component carrier identified in the selected beam update command, wherein applying the selected beam update command includes activating either the first TCI state or the second TCI state for each component carrier in the component carrier group depending on whether the beam update command corresponds to the first beam update command or the second beam update command.

In some aspects, a non-transitory computer-readable medium may store one or more instructions for wireless communication. The one or more instructions, when executed by one or more processors of a UE, may cause the one or more processors to: receive a message enabling joint TCI state activation for multiple component carriers in a component carrier group, wherein the multiple component carriers in the component carrier group are associated with a common TCI state identifier; and prioritize reception of QCL information associated with each of the multiple component carriers associated with the common TCI state identifier based at least in part on one or more rules prioritizing QCL information associated with at least one of the multiple component carriers in the component carrier group.

In some aspects, an apparatus for wireless communication may include means for receiving a signaling message that indicates one or more indicated component carrier sets, wherein the one or more indicated component carrier sets each include a component carrier group associated with joint TCI state activation; means for receiving a beam update command that identifies an individual component carrier and a TCI state to activate for the individual component carrier, wherein the individual component carrier is not included in the one or more indicated component carrier sets; and means for applying the beam update command to a set of one or more component carriers that includes at least the individual component carrier, wherein the individual component carrier is included in the set of one or more component carriers based at least in part on the individual component carrier not being in any of the one or more indicated component carrier sets.

In some aspects, an apparatus for wireless communication may include means for receiving a signaling message that indicates one or more component carrier sets, wherein the one or more component carrier sets each include a component carrier group associated with joint TCI state activation; means for receiving a beam update command that identifies a component carrier and a TCI state to activate for the component carrier, wherein the component carrier identified in the beam update command is included in the component carrier group associated with one of the one or more component carrier sets; and means for applying the beam update command to the component carrier group that includes the component carrier identified in the beam update command after an action time that is based at least in part on whether the beam update command is formatted for individual TCI state activation or joint TCI state activation.

In some aspects, an apparatus for wireless communication may include means for receiving a first beam update command that identifies a first TCI state to activate; means for receiving a second beam update command that identifies a second TCI state to activate; means for selecting a beam update command that corresponds to either the first beam update command or the second beam update command based at least in part on a difference in reception times between the first beam update command and the second beam update command satisfying a threshold; and means for applying the selected beam update command to a component carrier group that includes a component carrier identified in the selected beam update command, wherein applying the selected beam update command includes activating either the first TCI state or the second TCI state for each component carrier in the component carrier group depending on whether the beam update command corresponds to the first beam update command or the second beam update command.

In some aspects, an apparatus for wireless communication may include means for receiving a message enabling joint TCI state activation for multiple component carriers in a component carrier group, wherein the multiple component carriers in the component carrier group are associated with a common TCI state identifier; and means for prioritizing reception of QCL information associated with each of the multiple component carriers associated with the common TCI state identifier based at least in part on one or more rules prioritizing QCL information associated with at least one of the multiple component carriers in the component carrier group.

Aspects generally include a method, apparatus, system, computer program product, non-transitory computer-readable medium, UE, base station, wireless communication device, and/or processing system as substantially described with reference to and as illustrated by the drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
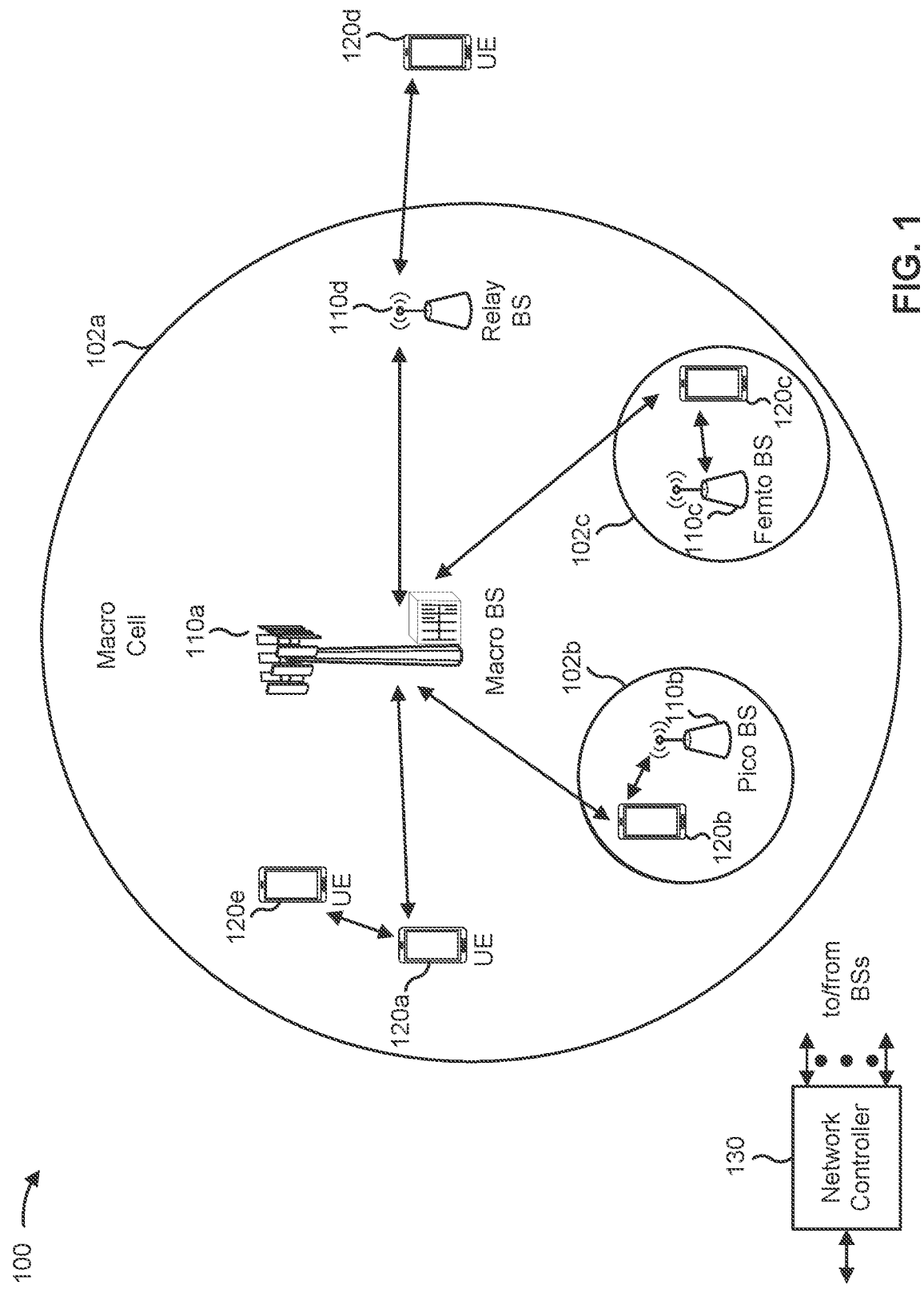
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G radio access technology (RAT, aspects of the present disclosure can be applied to other RATs, such as a 3G RAT, a 4G RAT, and/or a RAT subsequent to 5G (e.g., 6G).

FIG. 1 is a diagram illustrating an example of a wireless network 100 in which aspects of the present disclosure may be practiced. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed. Some RATs may be divided into component carriers and/or associated bandwidth parts, such as in a carrier aggregation deployment. In such a case, a BS may group a set of component carriers into a component carrier group and may transmit signaling configuring one or more component carrier groups for joint transmission configuration indication (TCI) state activation. When a beam update command indicates an updated TCI state for an individual component carrier, the UE may apply the beam update command after an action time based at least in part on a format of the beam update command. Furthermore, the UE may be configured with rules for applying the beam update command if the individual component carrier is not included in any of the component carrier groups and/or multiple beam update commands are received within a threshold time. Additionally, the UE may prioritize quasi co-located (QCL) reception for all component carriers that are associated with the same TCI state as another component carrier for which QCL reception is prioritized.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities may utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided merely as an example. Other examples may differ from what is described with regard to FIG. 1.

Figure 2:
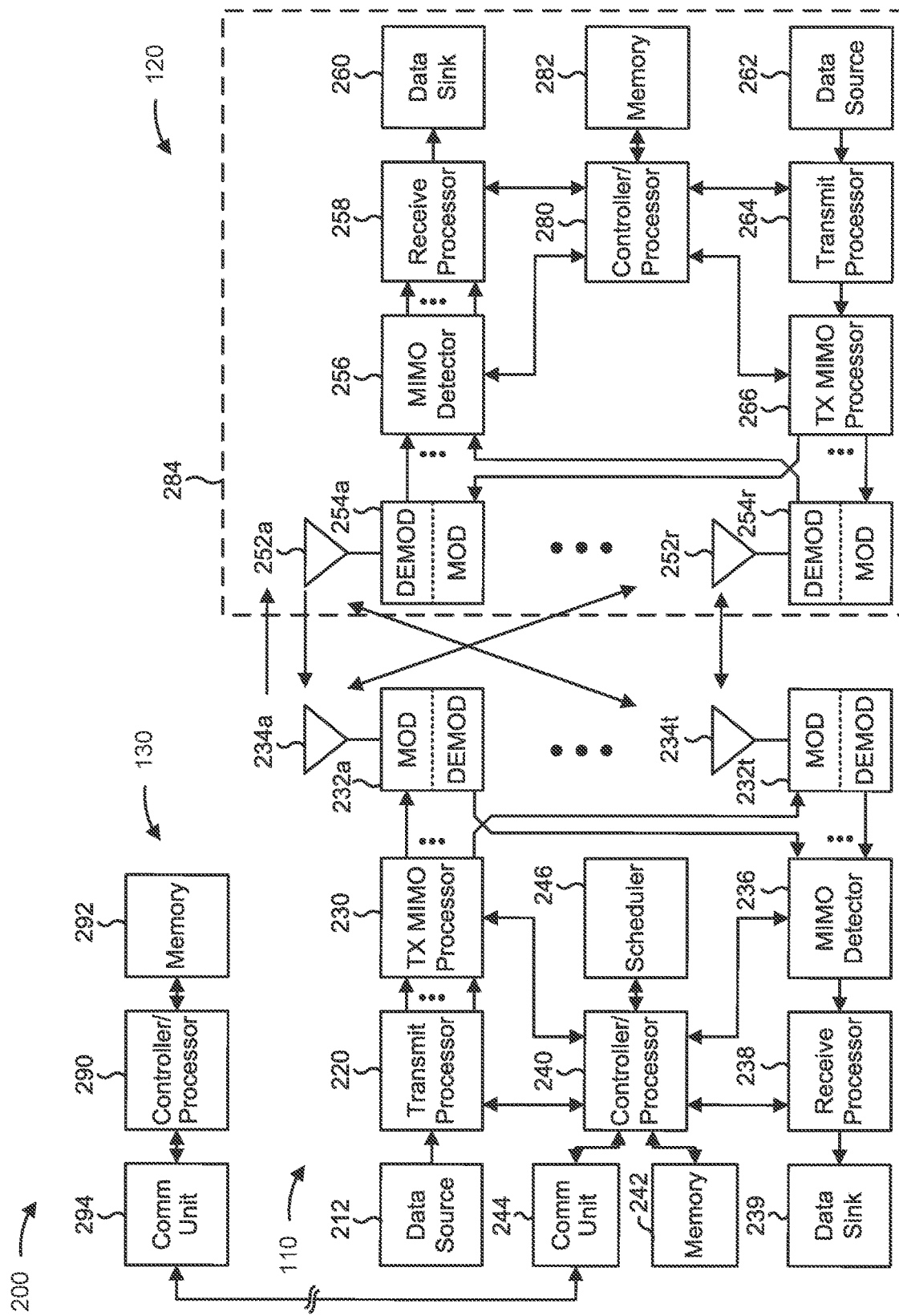
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal (e.g., an RRC signal to configure one or more component carrier sets, a MAC-CE to indicate a beam update command, and/or the like). T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information (e.g., information related to one or more component carrier sets, one or more beam update commands, and/or the like) to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

In some aspects, controller/processor 280 may apply one or more rules to determine how to apply the one or more beam update commands. For example, the UE may apply the beam update command after an action time based at least in part on a format of the beam update command. Furthermore, the UE may be configured with rules for applying the beam update command if the individual component carrier is not included in any of the component carrier groups and/or multiple beam update commands are received within a threshold time. Additionally, the UE may prioritize QCL reception for all component carriers that are associated with the same TCI state as another component carrier for which QCL reception is prioritized.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with updating beam information associated with a component carrier group, as described in more detail elsewhere herein. For example, controller/processor 240 of base station 110, controller/processor 280 of UE 120, and/or any other component(s) of FIG. 2 may perform or direct operations of, for example, method 400 of FIG. 4, method 500 of FIG. 5, method 600 of FIG. 6, method 700 of FIG. 7, and/or other processes as described herein. Memories 242 and 282 may store data and program codes for BS 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4, process 500 of FIG. 5, process 600 of FIG. 6, process 700 of FIG. 7, and/or other processes as described herein. In some aspects, executing instructions may include running the instructions, converting the instructions, compiling the instructions, interpreting the instructions, and/or the like.

As indicated above, FIG. 2 is provided merely as an example. Other examples may differ from what is described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHz may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, 5G may support a different air interface, other than an OFDM-based interface. 5G networks may include entities such as central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
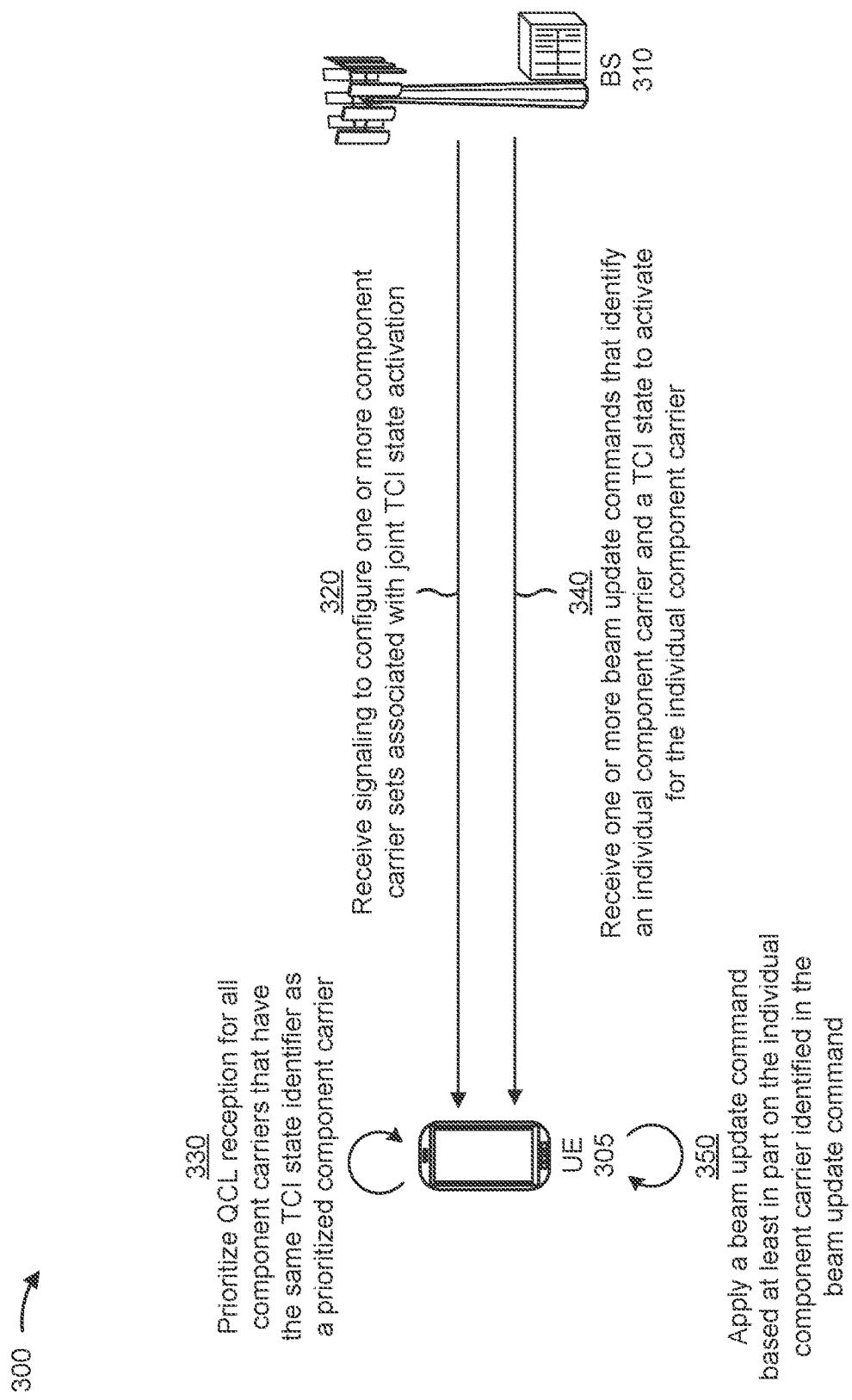
FIG. 3 is a diagram illustrating one or more examples of using operation rules to update beam information associated with one or more component carriers.

FIG. 3 is a diagram illustrating one or more examples 300 of using operation rules to update beam information associated with one or more component carriers. As shown in FIG. 3, example(s) 300 may include a UE 305 and a BS 310 communicating using carrier aggregation. For example, in some aspects, carrier aggregation may generally enable two or more component carriers (CCs, sometimes referred to as carriers) to be combined (e.g., into a single channel) for a single UE to enhance data capacity. In general, component carriers can be combined in the same or different frequency bands, the same or different frequency ranges, and/or the like. Additionally, or alternatively, contiguous or non-contiguous component carriers can be combined. In some aspects, the BS 310 may configure carrier aggregation for UE 305 in an intra-band contiguous mode where the aggregated component carriers are contiguous to one another and are in the same frequency band. Additionally, or alternatively, carrier aggregation may be configured in an intra-band non-contiguous mode where the aggregated component carriers are in the same frequency band and are non-contiguous to one another. Additionally, or alternatively, carrier aggregation may be configured in an inter-band non-contiguous mode where the aggregated component carriers are non-contiguous to one another and are in different frequency bands.

At 320, the BS 310 may transmit, and the UE 305 may receive, signaling to configure one or more component carrier sets that are associated with joint transmission configuration indication (TCI) state activation. In some aspects, the one or more component carrier sets may be indicated in radio resource control (RRC) signaling, and each set may include multiple component carriers, bandwidth parts, and/or the like for which TCI states are jointly activated. In some aspects, in cases where the UE 305 is configured with multiple component carrier sets, the multiple component carrier sets may be non-overlapping (e.g., a particular component carrier, bandwidth part, and/or the like included in one component carrier set is not included in any other component carrier set). Furthermore, in some aspects, the UE 305 may be associated with one or more serving cells (e.g., a serving cell associated with the BS 310, a serving cell TRP associated with the BS 310, a serving cell associated with a different BS, and/or the like), and every component carrier, bandwidth part, and/or the like associated with the serving cell(s) for the UE 305 may be included in one of the component carrier sets.

At 330, the UE 305 may prioritize QCL reception for all component carriers that have the same TCI state as a component carrier for which QCL reception is prioritized. For example, because the component carriers, bandwidth parts, and/or the like in a particular component carrier set are grouped together for joint TCI state activation, the component carriers, bandwidth parts, and/or the like that are grouped together may generally have the same TCI state(s). Accordingly, for QCL prioritization across different channels, reference signals, and/or the like that are simultaneously received across different component carriers, bandwidth parts, and/or the like, the UE 305 may assume that QCL information corresponding to a particular TCI state identifier is identical for all component carriers, bandwidth parts, and/or the like that share the particular TCI state identifier when group-based beam updating is enabled. Therefore, in cases where one or more rules prioritize reception for QCL information associated with a given component carrier (e.g., a component carrier having a lowest identifier, a lowest frequency, and/or the like), the UE 305 may prioritize QCL information associated with all other component carriers that have the same TCI state identifier as the given component carrier associated with the prioritized QCL reception. In this way, when one or more spatial reception parameters (e.g., a QCL Type D parameter) are prioritized for one component carrier associated with a given TCI state identifier, the UE 305 can assume that all other component carriers, bandwidth parts, associated with the same TCI state identifier have the same spatial reception parameters and therefore can also be prioritized. In this way, the one or more component carrier sets that are configured by the BS 310 may group component carriers, bandwidth parts, and/or the like for which QCL reception is to be prioritized.

Furthermore, in some aspects, similar principles may be used when the UE 305 performs beam failure detection. For example, when the UE 305 performs beam failure detection for one component carrier, bandwidth part, and/or the like in a particular component carrier set, results of the beam failure detection may be applied for all component carriers, bandwidth parts, and/or the like in the particular component carrier set. For example, if the UE 305 determines that there is signal loss, blockage, and/or the like for one component carrier, bandwidth part, and/or the like in a component carrier set, the UE 305 may determine that all other component carriers, bandwidth parts, and/or the like in the same component carrier set also have signal loss, blockage, and/or the like because all component carriers, bandwidth parts, and/or the like in the component carrier set are associated with the same set of TCI state identifiers.

At 340, the BS 310 may transmit, and the UE 305 may receive, one or more beam update commands that identify an individual component carrier and a TCI state to activate for the individual component carrier. For example, in some aspects, each of the one or more beam update commands may be included in a medium access control (MAC) control element (MAC-CE). In some aspects, the one or more beam update commands may be formatted in accordance with a first format used to update TCI state information for individual component carriers, bandwidth parts, and/or the like. Additionally, or alternatively, the one or more beam update commands may be formatted in accordance with a second format associated with joint TCI state activation. In either case, the beam update command(s) may identify an individual component carrier and/or bandwidth part and a set of one or more TCI states to activate for the individual component carrier and/or bandwidth part, and the UE 305 may determine how to apply the beam update command(s) based at least in part on the component carrier sets configured by the BS 310.

At 350, the UE 305 may apply a beam update command based at least in part on the individual component carrier identified in the beam update command. For example, in some aspects, the UE may identify a component carrier set that includes the individual component carrier identified in the beam update command and apply the one or more TCI states indicated in the beam update command to each component carrier that is in the same component carrier set as the component carrier identified in the beam update command and to each bandwidth part associated with such component carriers. For example, in some aspects, each serving cell configured for the UE 305 may be included in at least one component carrier set (e.g., using a simultaneousTCI-UpdateList1-r16 parameter, a simultaneousTCI-UpdateList2-r16 parameter, a simultaneousSpatial-UpdatedList1-r16 parameter, a simultaneousSpatial-UpdatedList2-r16 parameter, or another suitable parameter), and the UE 305 may apply the beam update command received from the base station to all of the serving cells that are in the same component carrier set as the individual component carrier identified in the beam update command.

However, in some cases, the individual component carrier indicated in the beam update command may not be included in any of the component carrier sets configured by the BS 310. Accordingly, in such cases, the UE 305 may apply one or more rules to determine how to apply the beam update command. For example, in some aspects, the UE 305 may apply the beam update command according to legacy behavior, which may include applying the beam update command to only the individual component carrier indicated in the beam update command. Alternatively, in some aspects, the UE 305 may configure an implicit component carrier set that includes any component carriers, bandwidth parts, and/or the like that are not included in any of the component carrier sets configured by the BS 310, and the UE 305 may apply the beam update command to all of the component carriers, bandwidth parts, and/or the like in the implicit component carrier set. Accordingly, in cases where the individual component carrier indicated in the beam update command is not included in any of the component carrier sets configured by the BS 310, the UE 305 may apply the beam update command to at least the individual component carrier indicated in the beam update command, and in some cases, may also apply the beam update command to any other component carriers, bandwidth parts, and/or the like that are not included in any of the component carrier sets configured by the BS 310.

In some aspects, the UE 305 may determine an action time after which the beam update command is ready to use or otherwise allowed to take effect. For example, based at least in part on the signaling to configure the one or more component carrier sets, the UE 305 may transmit, and the BS 310 may receive, an RRC reconfiguration complete message to acknowledge or otherwise indicate that the one or more component carrier sets have been configured, reconfigured, and/or the like at the UE 305. In some aspects, the BS 310 may then transmit, and the UE 305 may receive, an acknowledgement message based at least in part on the RRC reconfiguration complete message. In some aspects, the acknowledgement message may be used as an implicit indicator of the action time after which a group-based beam update command provided to the UE 305 is allowed to take effect. Additionally, or alternatively, the BS 310 may explicitly indicate the action time after which the group-based beam update command is allowed to take effect (e.g., via a MAC-CE, downlink control information (DCI), and/or the like). In some aspects, whether the action time is implicitly indicated by the acknowledgement to the reconfiguration complete message or explicitly indicated by the BS 310 may generally depend on a format of the group-based beam update command. For example, if the group-based beam update command is formatted for individual TCI state activation, the action time after which the group-based beam update command can be applied may correspond to a reception time of the acknowledgement to the reconfiguration complete message. Alternatively, if the group-based beam update command is formatted for joint TCI state activation, the action time may correspond to the reception time of the acknowledgement to the reconfiguration complete message or an explicit indicator that the BS 310 provides via downlink signaling (e.g., MAC-CE, DCI, and/or the like) to indicate that the beam update command is ready to apply.

In some cases, the UE 305 may receive multiple beam update commands within a threshold time of one another. For example, the UE 305 may receive a first beam update command and a second beam update command simultaneously (e.g., on different component carriers in the same component carrier set), within a short time of one another (e.g., within a few milliseconds of each other), and/or the like. Accordingly, in cases where the UE 305 receives multiple beam update commands and a difference in reception times between the multiple beam update commands satisfies a threshold (e.g., where the difference in reception times is zero in the case of simultaneous reception, less than and/or equal to a threshold value, and/or the like), the UE 305 may apply one or more rules to select a particular beam update command to apply. For example, in some aspects, the UE 305 may select the particular beam update command to apply based on arrival times of the multiple beam update commands. For example, the UE 305 may select one of the multiple beam update commands that has a latest arrival time, an earliest arrival time, and/or the like. Additionally, or alternatively, in some aspects, the UE 305 may select the particular beam update command to apply based on information associated with the component carrier identified in the multiple beam update commands. For example, the UE 305 may select one of the multiple beam update commands that identifies a component carrier with a highest index, a lowest index, and/or the like. Additionally, or alternatively, in some aspects, the UE 305 may be configured with another suitable rule that defines which beam update command to apply when multiple beam update commands are received simultaneously, within a threshold time, and/or the like.

As indicated above, FIG. 3 is provided as an example. Other examples may differ from what is described with respect to FIG. 3.

Figure 4:
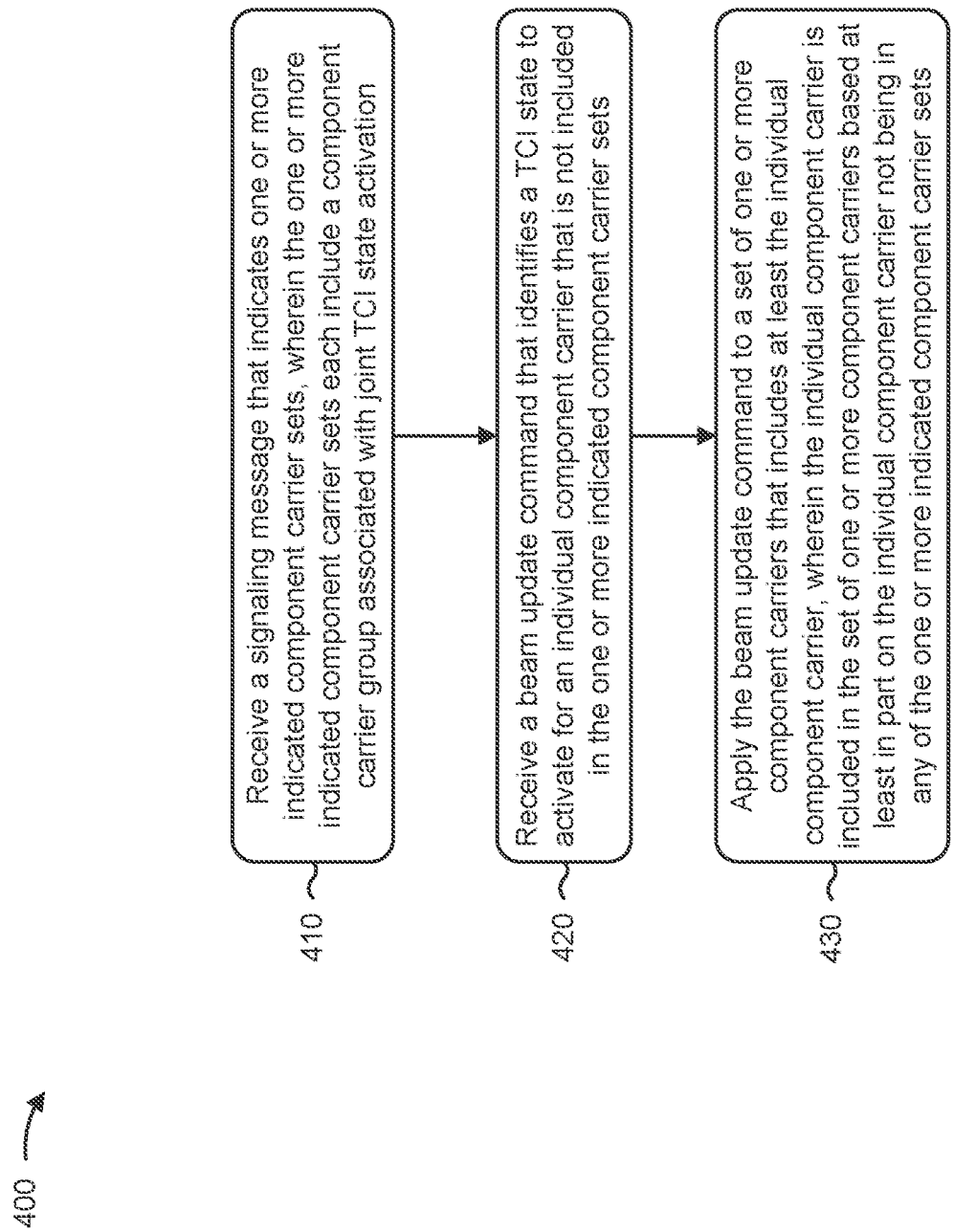
FIGS. 4-7 are flowcharts of one or more examples of methods of wireless communication.

FIG. 4 is a flowchart of a method 400 of wireless communication. The method 400 may be performed by UE (e.g., the UE 120, the UE 305, the apparatus 802/802', and/or the like).

At 410, the UE may receive a signaling message that indicates one or more indicated component carrier sets. For example, the UE (e.g., using antenna 252, DEMOD 254, MIMO detector 256, receive processor 258, controller/processor 280, and/or the like) may receive RRC signaling that indicates one or more indicated component carrier sets, each of which may include a component carrier group associated with joint TCI state activation, as described in more detail above. In a first aspect, the UE is associated with one or more serving cells, and each of the one or more serving cells is associated with a component carrier that is included in the component carrier group associated with one of the one or more indicated component carrier sets.

At 420, the UE may receive a beam update command that identifies an individual component carrier and a TCI state to activate for the individual component carrier (block 420). For example, the UE (e.g., using antenna 252, DEMOD 254, MIMO detector 256, receive processor 258, controller/processor 280, and/or the like) may receive a MAC-CE that includes a beam update command identifying an individual component carrier and a TCI state to activate for the individual component carrier, as described in more detail above. In some aspects, the individual component carrier identified in the beam update command is not included in the one or more indicated component carrier sets.

At 430, the UE may apply the beam update command to a set of component carriers that includes at least the individual component carrier identified in the beam update command. For example, the UE (e.g., using controller/processor 280, memory 282, and/or the like) may apply the beam update command to a set of one or more component carriers that includes at least the individual component carrier identified in the beam update command, as described in more detail above. In some aspects, the individual component carrier is included in the set of one or more component carriers based at least in part on the individual component carrier not being in any of the one or more indicated component carrier sets. In a second aspect, alone or in combination with the first aspect, the set of one or more component carriers to which the beam update command is applied includes only the individual component carrier identified in the beam update command. In a third aspect, alone or in combination with one or more of the first and second aspects, the set of one or more component carriers to which the beam update command is applied includes component carriers configured for the UE that are not included in any of the one or more indicated component carrier sets.

Method 400 may include additional aspects, such as any single aspect or any combination of aspects described above and/or in connection with one or more other processes described elsewhere herein.

Although FIG. 4 shows example blocks of a method of wireless communication, in some aspects, the method may include additional blocks, fewer blocks, different blocks, or differently arranged blocks than those shown in FIG. 4. Additionally, or alternatively, two or more blocks shown in FIG. 4 may be performed in parallel.

Figure 5:
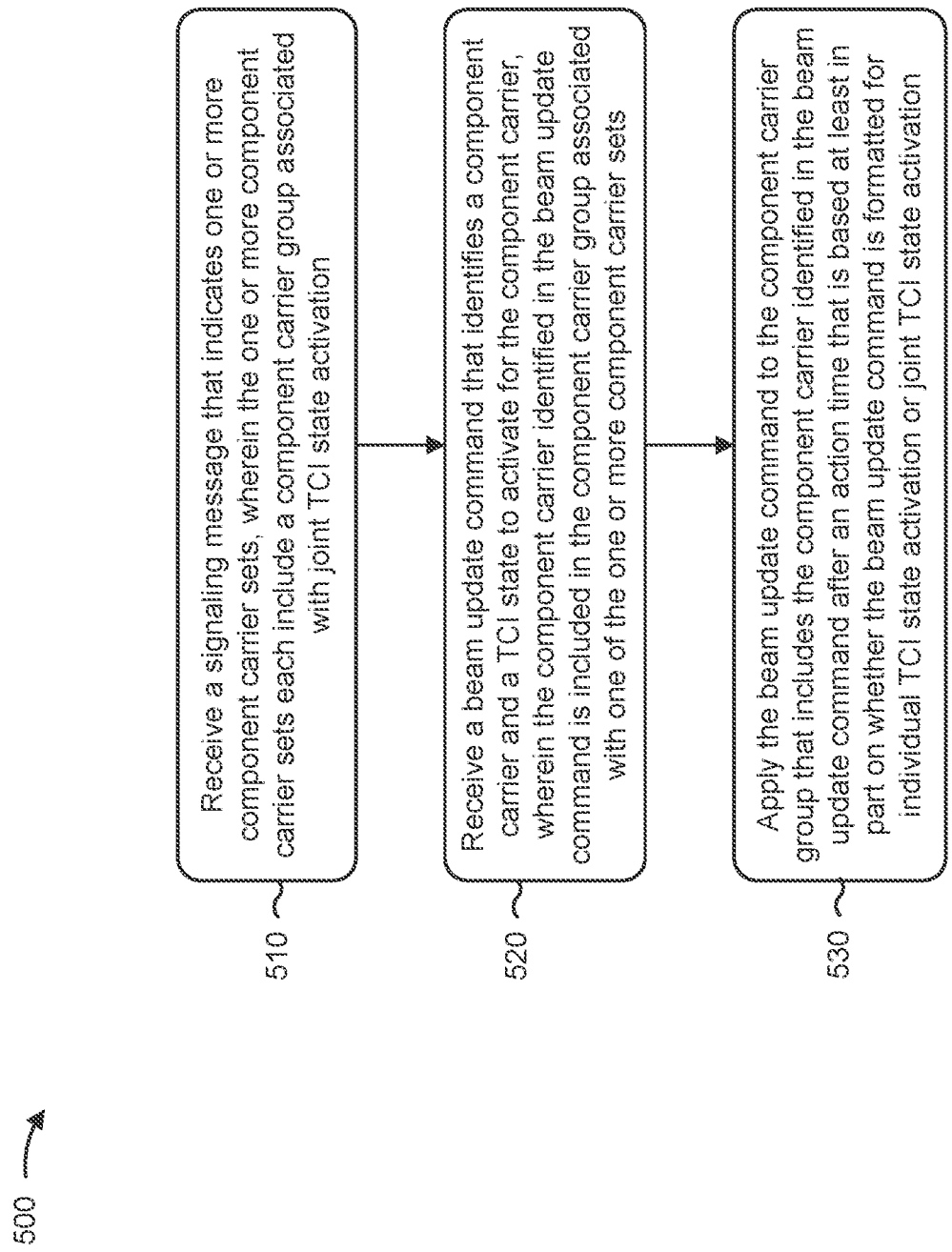

FIG. 5 is a flowchart of a method 500 of wireless communication. The method 500 may be performed by UE (e.g., the UE 120, the UE 305, the apparatus 802/802', and/or the like).

At 510, the UE may receive a signaling message that indicates one or more component carrier sets. For example, the UE (e.g., using antenna 252, DEMOD 254, MIMO detector 256, receive processor 258, controller/processor 280, and/or the like) may receive RRC signaling that indicates one or more component carrier sets, each of which may include a component carrier group associated with joint TCI state activation, as described in more detail above. In a first aspect, the UE is associated with one or more serving cells, and each of the one or more serving cells is associated with a component carrier that is included in the component carrier group associated with one of the one or more component carrier sets.

At 520, the UE may receive a beam update command that identifies a component carrier and a TCI state to activate for the component carrier. For example, the UE (e.g., using antenna 252, DEMOD 254, MIMO detector 256, receive processor 258, controller/processor 280, and/or the like) may receive a beam update command that identifies a component carrier and a TCI state to activate for the component carrier, as described in more detail above. In some aspects, the component carrier identified in the beam update command is included in the component carrier group associated with one of the one or more component carrier sets.

At 530, the UE may apply the beam update command to the component carrier group that includes the component carrier identified in the beam update command after an action time that is based at least in part on whether the beam update command is formatted for individual TCI state activation or joint TCI state activation. For example, the UE (e.g., using controller/processor 280, memory 282, and/or the like) may apply the beam update command to the component carrier group that includes the component carrier identified in the beam update command after an action time that is based at least in part on whether the beam update command is formatted for individual TCI state activation or joint TCI state activation, as described in more detail above. In a first aspect, the UE may transmit, to a BS, a reconfiguration complete message based at least in part on the signaling message that indicates one or more component carrier sets, the UE may receive, from the BS, an acknowledgement message based at least in part on the reconfiguration complete message, and the action time is a reception time of the acknowledgement message based at least in part on the beam update command being formatted for individual TCI state activation. In a second aspect, alone or in combination with the first aspect, the UE may receive, from the B S, an indication (e.g., via a MAC-CE, DCI, and/or the like) that the beam update command is ready to be applied, and the action time is a reception time of the indication based at least in part on the beam update command being formatted for joint TCI state activation.

Method 500 may include additional aspects, such as any single aspect or any combination of aspects described below and/or in connection with one or more other processes described elsewhere herein.

Although FIG. 5 shows example blocks of method 500, in some aspects, method 500 may include additional blocks, fewer blocks, different blocks, or differently arranged blocks than those depicted in FIG. 5. Additionally, or alternatively, two or more of the blocks of method 500 may be performed in parallel.

Figure 6:
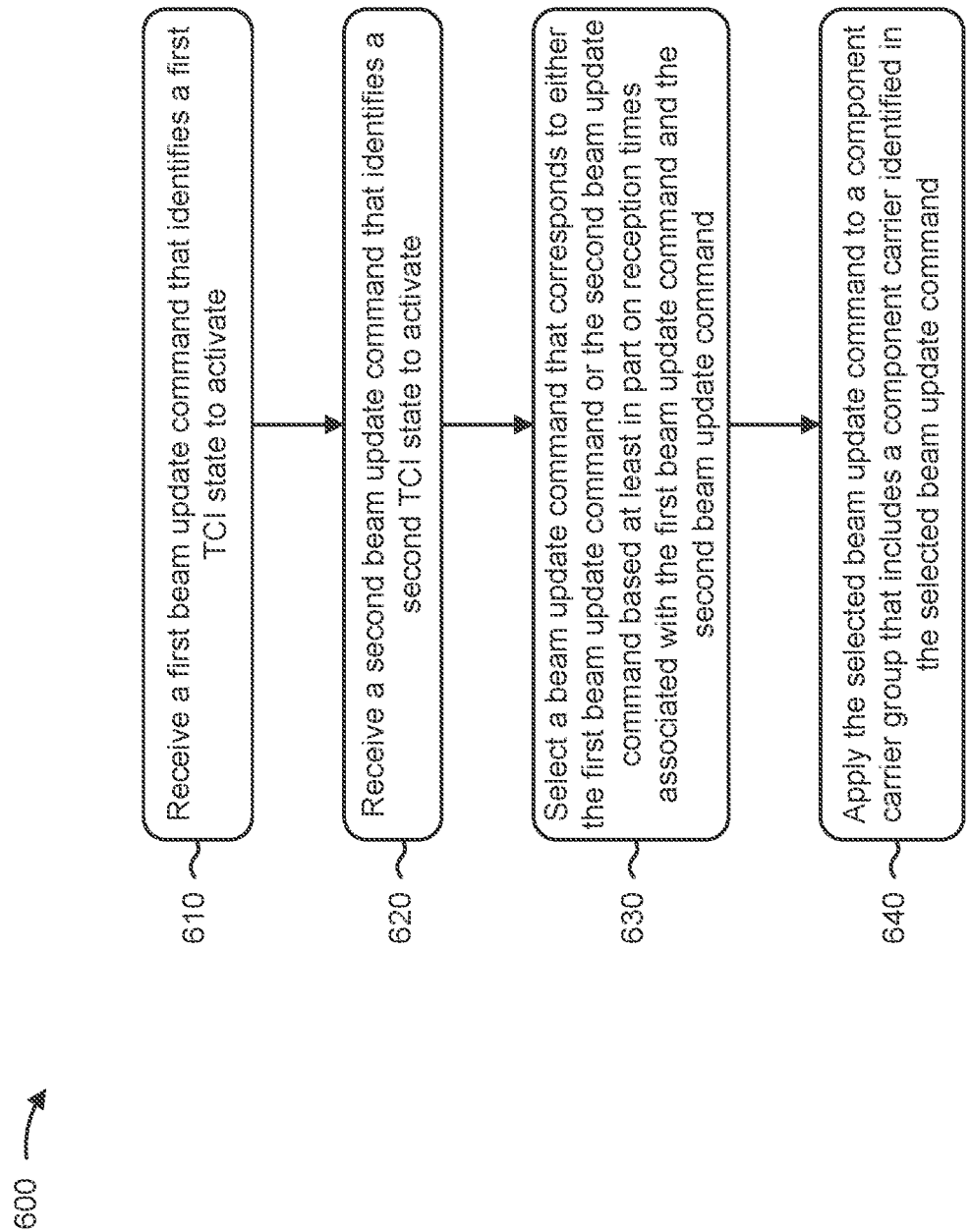

FIG. 6 is a flowchart of a method 600 of wireless communication. The method 600 may be performed by UE (e.g., the UE 120, the UE 305, the apparatus 802/802', and/or the like).

At 610, the UE may receive a first beam update command that identifies a first TCI state to activate. For example, the UE (e.g., using antenna 252, DEMOD 254, MIMO detector 256, receive processor 258, controller/processor 280, and/or the like) may receive a first beam update command that identifies a first TCI state to activate, as described in more detail above.

At 620, the UE may receive a second beam update command that identifies a second TCI state to activate. For example, the UE (e.g., using antenna 252, DEMOD 254, MIMO detector 256, receive processor 258, controller/processor 280, and/or the like) may receive a second beam update command that identifies a second TCI state to activate, as described in more detail above. In a first aspect, the first beam update command and the second beam update command are included in MAC-CEs.

At 630, the UE may select a beam update command that corresponds to either the first beam update command or the second beam update command based at least in part on reception times associated with the first beam update command and the second beam update. For example, the UE (e.g., using controller/processor 280, memory 282, and/or the like) may select a beam update command that corresponds to either the first beam update command or the second beam update command based at least in part on a difference in the reception times between the first beam update command and the second beam update command satisfying a threshold, as described in more detail above. In a second aspect, alone or in combination with the first aspect, the selected beam update command corresponds to one of the first beam update command or the second beam update command that has a latest arrival time. In a third aspect, alone or in combination with one or more of the first and second aspects, the selected beam update command corresponds to one of the first beam update command or the second beam update command that has an earliest arrival time. In a fourth aspect, alone or in combination with one or more of the first through third aspects, the selected beam update command corresponds to one of the first beam update command or the second beam update command that identifies a component carrier that has a lowest index. In a fifth aspect, alone or in combination with one or more of the first through fourth aspects, the selected beam update command corresponds to one of the first beam update command or the second beam update command that identifies a component carrier that has a highest index. In a sixth aspect, alone or in combination with one or more of the first through fifth aspects, the selected beam update command is based at least in part on a configured rule associated with the UE.

At 640, the UE may apply the selected beam update command to a component carrier group that includes a component carrier identified in the selected beam update command. For example, the UE (e.g., using controller/processor 280, memory 282, and/or the like) may apply the selected beam update command to a component carrier group that includes a component carrier identified in the selected beam update command, as described in more detail above. In some aspects, applying the selected beam update command includes activating either the first TCI state or the second TCI state for each component carrier in the component carrier group depending on whether the beam update command corresponds to the first beam update command or the second beam update command.

Method 600 may include additional aspects, such as any single aspect or any combination of aspects described below and/or in connection with one or more other processes described elsewhere herein.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
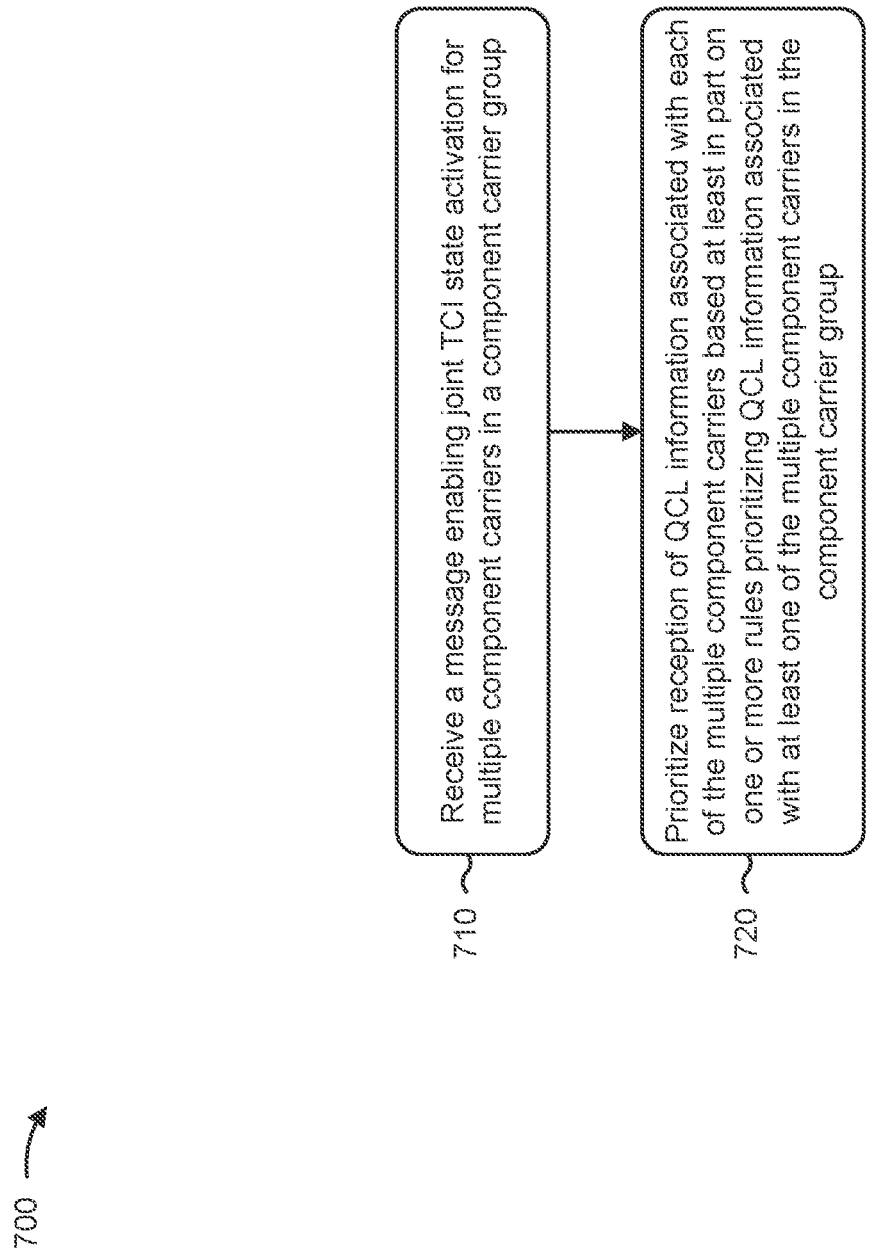

FIG. 7 is a flowchart of a method 700 of wireless communication. The method 700 may be performed by UE (e.g., the UE 120, the UE 305, the apparatus 802/802', and/or the like).

At 710, the UE may receive a message enabling joint TCI state activation for multiple component carriers in a component carrier group. For example, the UE (e.g., using antenna 252, DEMOD 254, MIMO detector 256, receive processor 258, controller/processor 280, and/or the like) may receive a message enabling joint TCI state activation for multiple component carriers in a component carrier group, as described in more detail above. In some aspects, the multiple component carriers in the component carrier group are associated with a common TCI state identifier.

At 720, the UE may prioritize reception of QCL information associated with each of the multiple component carriers associated with the common TCI state identifier. For example, the UE (e.g., using controller/processor 280, memory 282, and/or the like) may prioritize reception of QCL information associated with each of the multiple component carriers associated with the common TCI state identifier based at least in part on one or more rules prioritizing QCL information associated with at least one of the multiple component carriers in the component carrier group, as described in more detail above.

Method 700 may include additional aspects, such as any single aspect or any combination of aspects described below and/or in connection with one or more other processes described elsewhere herein.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
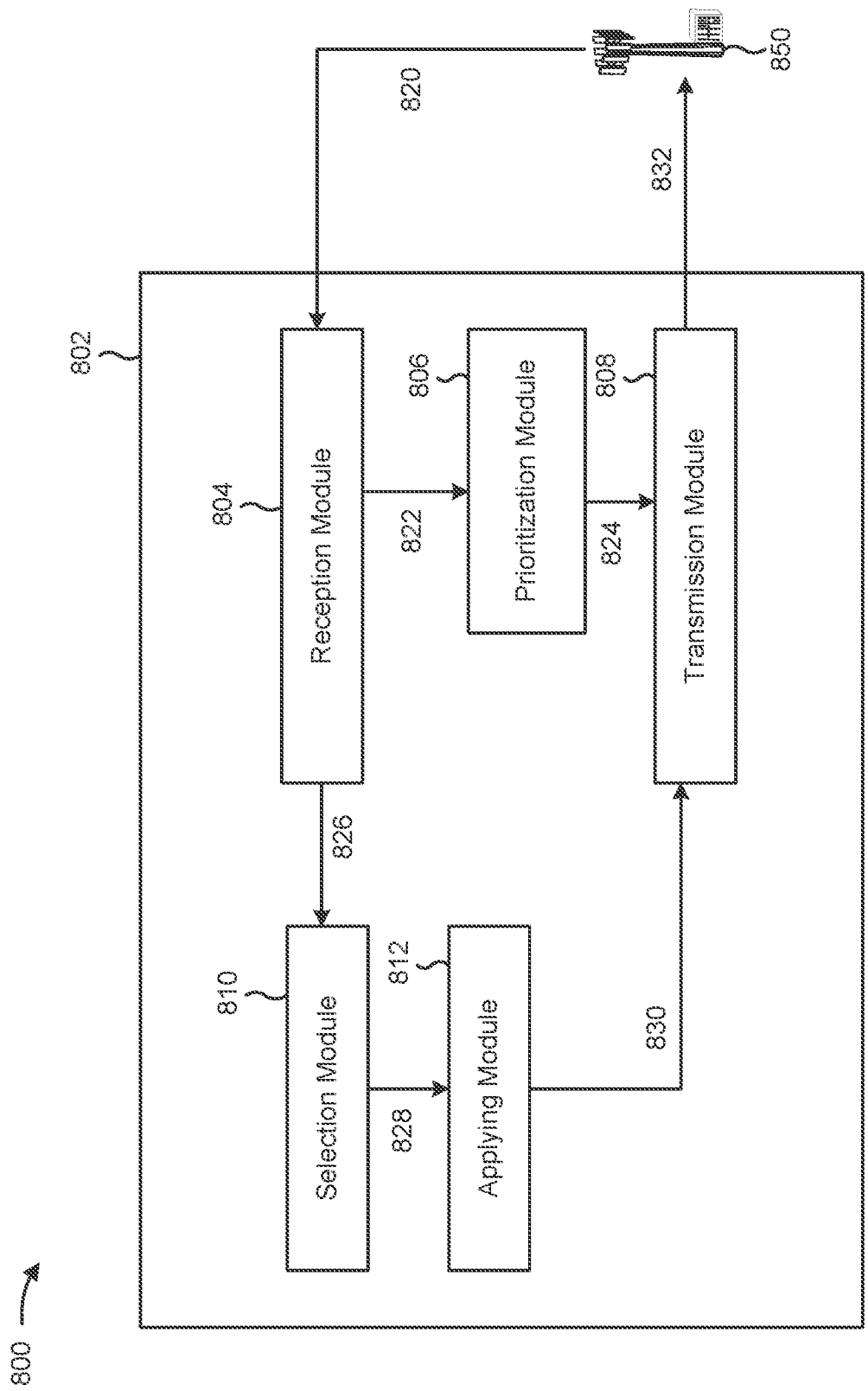
FIG. 8 is a block diagram illustrating an example data flow between different modules/means/components in an example apparatus.

FIG. 8 is a conceptual data flow diagram 800 illustrating data flow between different modules/means/components in an example apparatus 802. The apparatus 802 may be a UE in communication with a BS 850. In some aspects, the apparatus 802 includes a reception module 804, a prioritization module 806, a transmission module 808, a selection module 810, an application module 812, and/or the like.

Reception module 804 may receive, as data 820, one or more signaling messages from the BS 850. For example, the reception module 804 may receive RRC signaling from the BS 850 configuring one or more component carrier sets for joint TCI state activation. Additionally, or alternatively, the reception module 804 may receive a MAC-CE from the BS 850 that includes a beam update command identifying a component carrier and a TCI state to activate for the component carrier.

Prioritization module 806 may receive, as data 822 from the reception module 804, information related to the one or more component carrier sets configured for joint TCI state activation. The prioritization module 806 may prioritize QCL reception for all component carriers that have the same TCI state as a component carrier for which QCL reception is prioritized. Accordingly, for QCL prioritization across different channels, reference signals, and/or the like that are simultaneously received across different component carriers, bandwidth parts, and/or the like, the UE 305 may assume that QCL information corresponding to a particular TCI state identifier is identical for all component carriers, bandwidth parts, and/or the like that share the particular TCI state identifier when the data 822 received from the reception module 804 indicates that group-based beam updating is enabled.

Transmission module 808 may receive, as data 824 from the prioritization module, data 830 from the applying module, and/or the like, information related to the one or more component carrier sets configured for joint TCI state activation. In some aspects, the transmission module 808 may transmit, as data 832 to the BS 850, an RRC reconfiguration complete message to acknowledge the RRC signaling configuring the one or more component carrier sets.

Selection module 810 may receive, as data 826 from the reception module 804, information related to the one or more component carrier sets configured for joint TCI state activation. In some aspects, the selection module 810 may select a particular beam update command to apply when the data 826 from the reception module indicates that multiple beam update commands are received within a threshold time of one another. For example, when multiple beam update commands are received within a threshold time of one another, the selection module 810 may select one of the multiple beam update commands that has a latest arrival time, an earliest arrival time, a component carrier with a highest index, a lowest index, and/or the like.

Applying module 812 may receive, as data 828 from the selection module 810, information related to a beam update command to be applied. For example, the applying module 812 may identify a component carrier set that includes the individual component carrier identified in the beam update command to be applied, and apply the one or more TCI states indicated in the beam update command to each component carrier that is in the same component carrier set as the component carrier identified in the beam update command and to each bandwidth part associated with such component carriers. Additionally, or alternatively, in cases where the individual component carrier indicated in the beam update command is not be included in any of the component carrier sets configured by the BS 850, the applying module 812 may apply the beam update command according to one or more rules. For example, in some aspects, the applying module 812 may apply the beam update command to only the individual component carrier indicated in the beam update command, or the applying module 812 may apply the beam update command to all component carriers in an implicit component carrier set that includes any component carriers, bandwidth parts, and/or the like that are not included in any of the component carrier sets configured by the BS 850.

The apparatus 802 may include additional modules that perform each of the blocks of the algorithm in the aforementioned method 400 of FIG. 4, method 500 of FIG. 5, method 600 of FIG. 6, method 700 of FIG. 7, and/or the like. Each block in the aforementioned method 400 of FIG. 4, method 500 of FIG. 5, method 600 of FIG. 6, method 700 of FIG. 7, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
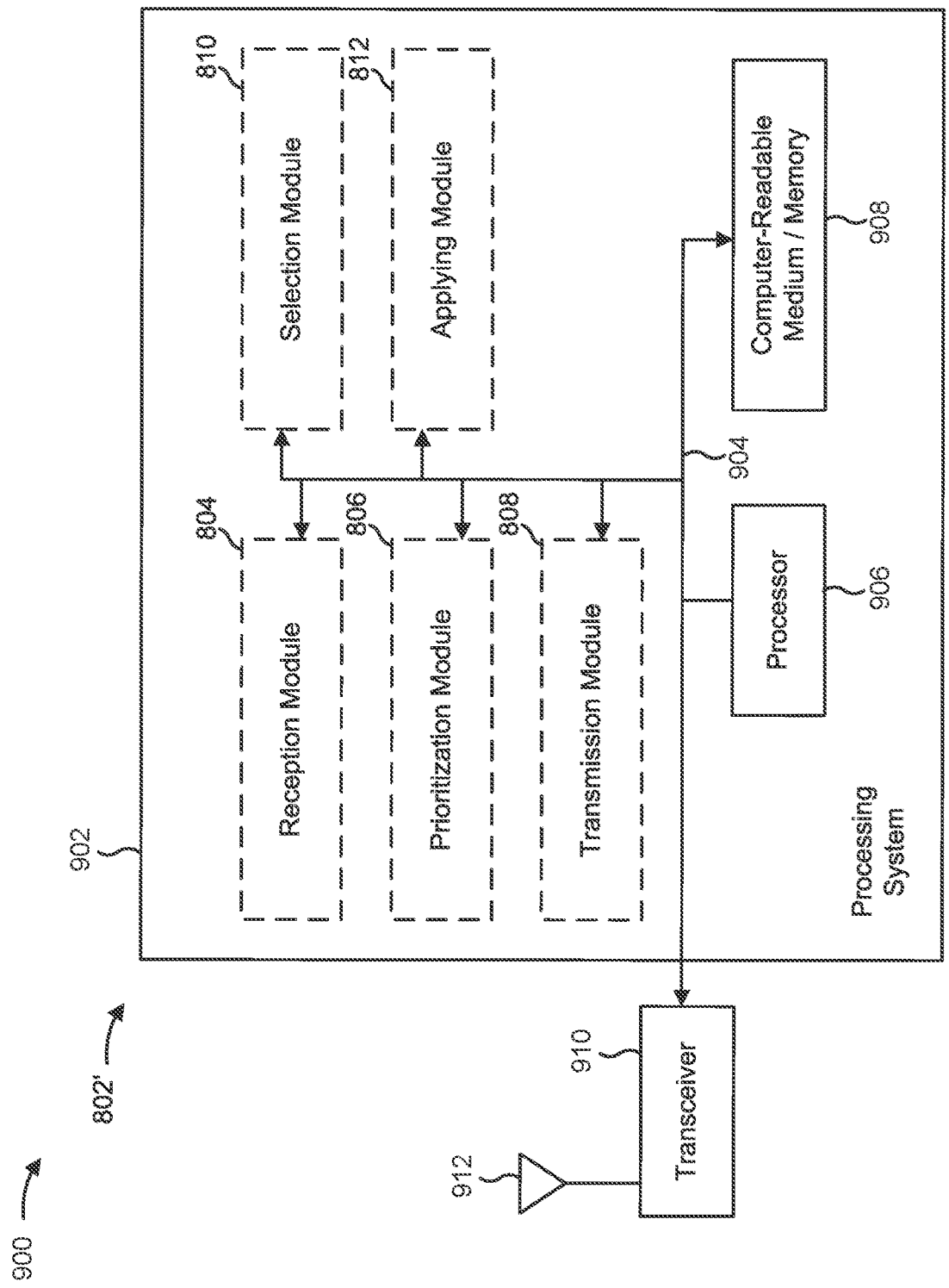
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a UE.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, 810, 812, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the modules 804, 806, 808, 810, 812. The modules 804, 806, 808, 810, 812 may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the TX MIMO processor 266, the RX processor 258, and/or the controller/processor 280.

In some aspects, the apparatus 802/802' for wireless communication includes means for receiving a signaling message that indicates one or more component carrier sets, means for receiving one or more beam update commands, means for receiving a message enabling joint TCI state activation for multiple component carriers in a component carrier group, means for selecting a beam update command based at least in part on reception time of the one or more beam update commands, means for applying the beam update command to one or more component carriers, means for prioritizing reception of QCL information associated with multiple component carriers associated with a common TCI state identifier, and/or the like. The aforementioned means may be one or more of the aforementioned modules of the apparatus 802 and/or the processing system 902 of the apparatus 802' configured to perform the functions recited by the aforementioned means. As described elsewhere herein, the processing system 902 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The above description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
    receiving a signaling message that indicates one or more indicated component carrier sets, wherein the one or more indicated component carrier sets each include a component carrier group associated with joint transmission configuration indication (TCI) state activation;
    receiving, based at least in part on receiving the signaling message, a beam update command that identifies an individual component carrier, not included in the one or more indicated component carrier sets, and a TCI state to activate for the individual component carrier; and
    applying, based at least in part on the individual component carrier not being included in the one or more indicated component carrier sets, the beam update command to each component carrier set of one or more component carrier sets that includes at least the individual component carrier of the beam update command,
        wherein each serving cell configured for the UE is included in the one or more component carrier sets.

2. The method of claim 1, wherein the one or more component sets to which the beam update command is applied includes only the individual component carrier identified in the beam update command.

3. The method of claim 1, wherein the signaling message that indicates the one or more indicated component carrier sets is a radio resource control signaling message, and wherein the beam update command is included in a medium access control control element.

4. A user equipment (UE) for wireless communication, comprising:
    memory; and
    one or more processors coupled to the memory, the one or more processors configured to:
    receive a signaling message that indicates one or more indicated component carrier sets, wherein the one or more indicated component carrier sets each include a component carrier group associated with joint transmission configuration indication (TCI) state activation;
    receive, based at least in part on receiving the signaling message, a beam update command that identifies an individual component carrier, not included in the one or more indicated component carrier sets, and a TCI state to activate for the individual component carrier; and
    apply, based at least in part on the individual component carrier not being included in the one or more indicated component carrier sets, the beam update command to each component carrier set of one or more component carrier sets that includes at least the individual component carrier of the beam update command,
        wherein each serving cell configured for the UE is included in the one or more component carrier sets.

5. The UE of claim 4, wherein the one or more component sets to which the beam update command is applied includes only the individual component carrier identified in the beam update command.

6. The UE of claim 4, wherein the signaling message that indicates the one or more indicated component carrier sets is a radio resource control signaling message, and wherein the beam update command is included in a medium access control control element.

7. A non-transitory computer-readable medium storing one or more instructions for wireless communication, the one or more instructions comprising:
    one or more instructions that, when executed by one or more processors of a user equipment (UE), cause the one or more processors to:
    receive a signaling message that indicates one or more indicated component carrier sets, wherein the one or more indicated component carrier sets each include a component carrier group associated with joint transmission configuration indication (TCI) state activation;
    receive, based at least in part on receiving the signaling message, a beam update command that identifies an individual component carrier, not included in the one or more indicated component carrier sets, and a TCI state to activate for the individual component carrier; and
    apply, based at least in part on the individual component carrier not being included in the one or more indicated component carrier sets, the beam update command to each component carrier set of one or more component carrier sets that includes at least the individual component carrier of the beam update command,
        wherein each serving cell configured for the UE is included in the one or more component carrier sets.

8. An apparatus for wireless communication, comprising:
    means for receiving a signaling message that indicates one or more indicated component carrier sets, wherein the one or more indicated component carrier sets each include a component carrier group associated with joint transmission configuration indication (TCI) state activation;

means for receiving, based at least in part on receiving the signaling message, a beam update command that identifies an individual component carrier, not included in the one or more indicated component carrier sets, and a TCI state to activate for the individual component carrier; and means for applying, based at least in part on the individual component carrier not being included in the one or more indicated component carrier sets, the beam update command to each component carrier set of one or more component carrier sets that includes at least the individual component carrier of the beam update command, wherein each serving cell configured for the apparatus is included in the one or more component carrier sets.

9. A method of wireless communication performed by a user equipment (UE), comprising:

receiving a signaling message that indicates one or more indicated component carrier sets;

receiving, based at least in part on receiving the signaling message, a beam update command that identifies an individual component carrier, not included in the one or more indicated component carrier sets, and a transmission configuration indication (TCI) state to activate for the individual component carrier; and applying, based at least in part on the individual component carrier not being included in the one or more indicated component carrier sets, the beam update command to each component carrier set of one or more component carrier sets that includes at least the individual component carrier of the beam update command, wherein each serving cell configured for the UE is included in the one or more component carrier sets.

10. The method of claim 9, wherein the or more component carrier sets to which the beam update command is applied includes only the individual component carrier identified in the beam update command.

11. The method of claim 9, wherein the signaling message that indicates the one or more indicated component carrier sets is a radio resource control signaling message, and wherein the beam update command is included in a medium access control control element.

12. A user equipment (UE) for wireless communication, comprising:

memory; and one or more processors coupled to the memory, the one or more processors configured to:

receive a signaling message that indicates one or more indicated component carrier sets;

receive, based at least in part on receiving the signaling message, a beam update command that identifies an individual component carrier, not included in the one or more indicated component carrier sets, and a transmission configuration indication (TCI) state to activate for the individual component carrier; and apply, based at least in part on the individual component carrier not being included in the one or more indicated component carrier sets, the beam update command to each component carrier set of one or more component carrier sets that includes at least the individual component carrier of the beam update command, wherein each serving cell configured for the UE is included in the one or more component carrier sets.

13. The UE of claim 12, wherein the one or more component carrier sets to which the beam update command is applied includes only the individual component carrier identified in the beam update command.

14. The UE of claim 12, wherein the signaling message that indicates the one or more indicated component carrier sets is a radio resource control signaling message, and wherein the beam update command is included in a medium access control control element.

15. The non-transitory computer-readable medium of claim 7, wherein the one or more component carrier sets to which the beam update command is applied includes only the individual component carrier identified in the beam update command.

16. The non-transitory computer-readable medium of claim 7, wherein the signaling message that indicates the one or more indicated component carrier sets is a radio resource control signaling message, and wherein the beam update command is included in a medium access control control element.

17. A non-transitory computer-readable medium storing one or more instructions for wireless communication, the one or more instructions comprising:

one or more instructions that, when executed by one or more processors of a user equipment (UE), cause the one or more processors to:

receive a signaling message that indicates one or more indicated component carrier sets;

receive, based at least in part on receiving the signaling message, a beam update command that identifies an individual component carrier, not included in the one or more indicated component carrier sets, and a transmission configuration indication (TCI) state to activate for the individual component carrier; and apply, based at least in part on the individual component carrier not being included in the one or more indicated component carrier sets, the beam update command to each component carrier set of one or more component carrier sets that includes at least the individual component carrier of the beam update command, wherein each serving cell configured for the UE is included in the one or more component carrier sets.

18. The non-transitory computer-readable medium of claim 17, wherein the one or more component carrier sets to which the beam update command is applied includes only the individual component carrier identified in the beam update command.

19. The non-transitory computer-readable medium of claim 17, wherein the signaling message that indicates the one or more indicated component carrier sets is a radio resource control signaling message, and wherein the beam update command is included in a medium access control control element.

20. The apparatus of claim 8, wherein the one or more component carrier sets to which the beam update command is applied includes only the individual component carrier identified in the beam update command.

21. The apparatus of claim 8, wherein the signaling message that indicates the one or more indicated component carrier sets is a radio resource control signaling message, and wherein the beam update command is included in a medium access control control element.

22. An apparatus for wireless communication, comprising:
  means for receiving a signaling message that indicates one or more indicated component carrier sets;
  means for receiving, based at least in part on receiving the signaling message, a beam update command that identifies an individual component carrier, not included in the one or more indicated component carrier sets, and a transmission configuration indication (TCI) state to activate for the individual component carrier; and
  means for applying, based at least in part on the individual component carrier not being included in the one or more indicated component carrier sets, the beam update command to each component carrier set of one or more component carrier sets that includes at least the individual component carrier of the beam update command,
    wherein each serving cell configured for the apparatus is included in the one or more component carrier sets.

23. The apparatus of claim 22, wherein the one or more component carrier sets to which the beam update command is applied includes only the individual component carrier identified in the beam update command.

24. The apparatus of claim 22, wherein the signaling message that indicates the one or more indicated component carrier sets is a radio resource control signaling message, and wherein the beam update command is included in a medium access control control element.

25. The method of claim 1, wherein the one or more component carrier sets includes a plurality of component carrier sets that are overlapping.

26. The method of claim 1, further comprising:
  transmitting a radio resource control (RRC) reconfiguration complication message that indicates that the beam update command has been applied to each component carrier set of the one or more component carrier sets.

27. The method of claim 1, wherein beam update command is applied based at least in part on an action time after which the beam update command is to take effect.

28. The method of claim 1, further comprising:
  receiving another beam update command that identifies another individual component carrier, not included in the one or more indicated component carrier sets, and another TCI state to activate for the other individual component carrier; and
  selecting one of the beam update command or the other beam update command based at least in part on one or more rules that define which beam update command to apply when multiple beam update commands are received,
    wherein applying the beam update command comprises applying the selected one of the beam update command or the other beam update command.

29. The UE of claim 4, wherein the one or more component carrier sets includes a plurality of component carrier sets that are overlapping.

30. The UE of claim 4, wherein the one or more processors are further configured to:
  transmit a radio resource control (RRC) reconfiguration complication message that indicates that the beam update command has been applied to each component carrier set of the one or more component carrier sets.

31. The UE of claim 4, wherein beam update command is applied based at least in part on an action time after which the beam update command is to take effect.

32. The UE of claim 4, wherein the one or more processors are further configured to:
  receive another beam update command that identifies another individual component carrier, not included in the one or more indicated component carrier sets, and another TCI state to activate for the other individual component carrier; and
  select one of the beam update command or the other beam update command based at least in part on one or more rules that define which beam update command to apply when multiple beam update commands are received,
    wherein the one or more processors, to apply the beam update command, are configured to apply the selected one of the beam update command or the other beam update command.

33. The non-transitory computer-readable medium of claim 7, wherein the one or more component carrier sets includes a plurality of component carrier sets that are overlapping.

34. The non-transitory computer-readable medium of claim 7, wherein the one or more instructions that, when executed by the one or more processors of the UE, further cause the one or more processors to:
  transmit a radio resource control (RRC) reconfiguration complication message that indicates that the beam update command has been applied to each component carrier set of the one or more component carrier sets.

35. The non-transitory computer-readable medium of claim 7, wherein beam update command is applied based at least in part on an action time after which the beam update command is to take effect.

36. The non-transitory computer-readable medium of claim 7, wherein the one or more instructions that, when executed by the one or more processors of the UE, further cause the one or more processors to:
  receive another beam update command that identifies another individual component carrier, not included in the one or more indicated component carrier sets, and another TCI state to activate for the other individual component carrier; and
  select one of the beam update command or the other beam update command based at least in part on one or more rules that define which beam update command to apply when multiple beam update commands are received,
    wherein the one or more instructions, that cause the one or more processors of the UE to apply the beam update command, cause the UE to:
      applying the selected one of the beam update command or the other beam update command.

37. The apparatus of claim 8, wherein the one or more component carrier sets includes a plurality of component carrier sets that are overlapping.

38. The apparatus of claim 8, further comprising:
  means for transmitting a radio resource control (RRC) reconfiguration complication message that indicates that the beam update command has been applied to each component carrier set of the one or more component carrier sets.

39. The apparatus of claim 8, wherein beam update command is applied based at least in part on an action time after which the beam update command is to take effect.

40. The apparatus of claim 8, further comprising:
  means for receiving another beam update command that identifies another individual component carrier, not included in the one or more indicated component carrier sets, and another TCI state to activate for the other individual component carrier; and means for selecting one of the beam update command or the other beam update command based at least in part on one or more rules that define which beam update command to apply when multiple beam update commands are received,
    wherein the means for applying the beam update command comprises the means for applying the selected one of the beam update command or the other beam update command.

41. The UE of claim 12, wherein the one or more component carrier sets includes a plurality of component carrier sets that are overlapping.

42. The UE of claim 12, wherein the one or more processors are further configured to:
    transmit a radio resource control (RRC) reconfiguration complication message that indicates that the beam update command has been applied to each component carrier set of the one or more component carrier sets.

43. The UE of claim 12, wherein beam update command is applied based at least in part on an action time after which the beam update command is to take effect.

44. The UE of claim 12, wherein the one or more processors are further configured to:
    receive another beam update command that identifies another individual component carrier, not included in the one or more indicated component carrier sets, and another TCI state to activate for the other individual component carrier; and
    select one of the beam update command or the other beam update command based at least in part on one or more rules that define which beam update command to apply when multiple beam update commands are received,
    wherein the one or more processors, to apply the beam update command, are configured to apply the selected one of the beam update command or the other beam update command.

\* \* \* \* \*